US011809249B2

(12) United States Patent
Scheel

(10) Patent No.: US 11,809,249 B2
(45) Date of Patent: *Nov. 7, 2023

(54) PORT CONTROLLER WITH REAL-TIME FAULT DETECTION

(71) Applicant: Alpha and Omega Semiconductor International LP, Toronto (CA)

(72) Inventor: Michael Scheel, San Jose, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,591

(22) Filed: Feb. 7, 2022

(65) Prior Publication Data

US 2022/0155838 A1    May 19, 2022

Related U.S. Application Data

(63) Continuation of application No. 16/913,438, filed on Jun. 26, 2020, now Pat. No. 11,269,390.

(51) Int. Cl.
*G06F 1/26* (2006.01)
*G06F 13/38* (2006.01)

(52) U.S. Cl.
CPC ............ *G06F 1/266* (2013.01); *G06F 13/382* (2013.01); *G06F 2213/0042* (2013.01)

(58) Field of Classification Search
CPC . G06F 1/266; G06F 13/382; G06F 2213/0042
See application file for complete search history.

(56) References Cited

U.S. PATENT DOCUMENTS

| 7,042,280 | B1* | 5/2006 | Huang ................... G05F 1/573 327/541 |
| 9,652,351 | B2 | 5/2017 | Srivastava et al. |
| 10,664,029 | B2 | 5/2020 | Koga |
| 11,100,034 | B1 | 8/2021 | Vispute et al. |
| 11,269,390 | B2* | 3/2022 | Scheel .................. G06F 13/382 |
| 2001/0014951 | A1 | 8/2001 | Odaohhara et al. |
| 2008/0265838 | A1 | 10/2008 | Garg et al. |

(Continued)

FOREIGN PATENT DOCUMENTS

| CN | 107209539 A | 9/2017 |
| CN | 108923383 A | 11/2018 |

OTHER PUBLICATIONS

Office Action and Search Report for Taiwan Application No. 110120720, dated Dec. 27, 2021, 4 pages.

*Primary Examiner* — Nimesh G Patel

(57) ABSTRACT

A port controller circuit is configured to control power transfer on a power path between a first terminal and a second terminal. The controller circuit includes first and second transistors connected in series between the first terminal and the second terminal, a control terminal of the first transistor receiving a first gate voltage and a control terminal of the second transistor receiving a second gate voltage. A first gate voltage control circuit generates the first gate voltage driving the control terminal of the first transistor and regulates the first gate voltage to keep the first transistor turned on. In response to the first gate voltage control circuit regulating the first gate voltage to a voltage value less than a first voltage level, the first gate voltage control circuit asserts a first signal to indicate a fault condition at the first transistor.

20 Claims, 9 Drawing Sheets

(56) References Cited

U.S. PATENT DOCUMENTS

| | | |
|---|---|---|
| 2013/0187452 A1 | 7/2013 | Dickey |
| 2015/0015300 A1 | 1/2015 | Simonson et al. |
| 2017/0060216 A1 | 3/2017 | Waters et al. |
| 2017/0336844 A1 | 11/2017 | Koga |
| 2018/0331678 A1 | 11/2018 | Kaneda |
| 2019/0265739 A1* | 8/2019 | Kuroda ............... H03F 3/45264 |

* cited by examiner

PORT CONTROLLER WITH REAL-TIME FAULT DETECTION

CROSS REFERENCE TO OTHER APPLICATIONS

This application is a continuation of U.S. patent application Ser. No. 16/913,438, entitled PORT CONTROLLER WITH REAL-TIME FAULT DETECTION, filed Jun. 26, 2020, now U.S. Pat. No. 11,269,390, issued Mar. 8, 2022, which is incorporated herein by reference for all purposes.

FIELD OF THE INVENTION

The invention relates to short detection and protection in multi-port systems and in particular, to real-time fault detection and reporting in a multi-port system.

BACKGROUND OF THE INVENTION

Electronic systems, such as laptop computers, often includes one or more serial ports, such as universal serial bus (USB) ports, for serial data communication as well as for power delivery with external devices. In some examples, rechargeable portable equipment requires an external power source to charge its batteries and USB ports have become a convenient means for charging because of the available bus power as power source. Power delivery using USB ports have gained further popularity with the introduction of USB-C standard and the USB Power Delivery (USB-PD) standard. The USB-PD standard is a specification for handling higher power and allows a range of devices to charge quickly over a USB connection. The USB-PD standard operates by facilitating a conversation between two devices to negotiate a power contract so they can determine how much power can be pulled from the charger. Power Delivery starts at the 5V setting and is configurable up to 20V. The USB-PD standard enables power delivery up to 60 W using a standard USB-C cable. Another feature of USB Power Delivery is that it allows for power to flow both ways, with no set direction based on circuit or connection.

Devices such as laptop computers, laptop docking stations, serial hubs, chargers or adapters include one or more ports to support power delivery. These ports are sometimes referred to as power delivery charge ports. In a parallel multi-port system, each port is coupled to a port controller to provide power control and protection functions at the port. A power delivery port controller connects a power provider and a power consumer at a port and enables negotiation between the devices to establish the power contract. Implementation of port controllers typically includes fault detection and protection to ensure that a failure at one port does not cause catastrophic damage to the other port or to the connected devices.

BRIEF DESCRIPTION OF THE DRAWINGS

Various embodiments of the invention are disclosed in the following detailed description and the accompanying drawings.

DETAILED DESCRIPTION

According to embodiments of the present invention, a port controller implements real-time monitoring and detection of power path failures by regulating the control voltage to the power path power switches during the on-state of the power switches. A fault condition is indicated when the control voltage to a power switch is regulated to a voltage level outside of a permissible range. The port controller can be applied to detect single point failure, such as a short along the power path of the port controller, in a multi-port application so that power loading from one port will not harm the other ports. The port controller implements real-time monitoring where a short within the power path can be detected and the fault condition can be used to disable the other port controllers in the multi-port system, thereby protecting the other ports. In one embodiment, a port controller includes a pair of back-to-back transistors forming the power path and the real-time fault detection scheme is applied to control each transistor independently to determine if either transistor has a fault condition.

In the present description, real-time monitoring and detection of power path failure refers to fault detection in the power path of a port controller when the power path is activated or enabled and the power path power switches are turned on or enabled. This is in contrast to conventional fault detection scheme where a fault detection is only possible when the power path is disabled. The real-time fault detection scheme of the present disclosure is implemented in a port controller to enable detection of fault conditions when the power path is enabled or activated to realize detection of a broad range of fault conditions.

Figure 1:
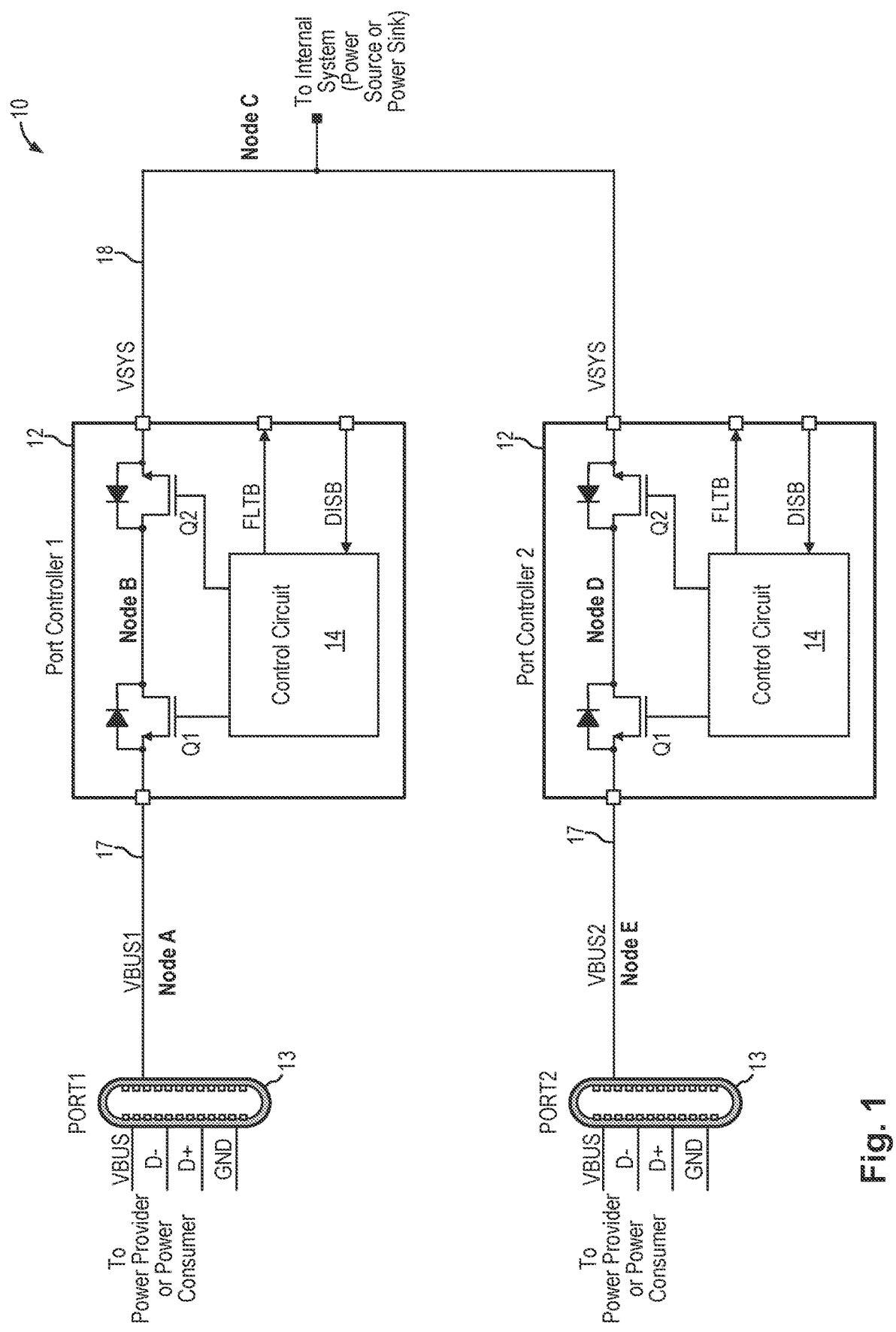
FIG. 1 illustrates a multi-port system including port controllers connected to respective serial ports in some examples of the present disclosure.

FIG. 1 illustrates a multi-port system including port controllers connected to respective serial ports in some examples of the present disclosure. Referring to FIG. 1, a multi-port system 10 includes a pair of port controllers 12 coupled to control respective serial ports 13, including Port1 and Port2. In particular, the port controller 1 is coupled to serial port Port1 while the port controller 2 is coupled to serial port Port 2. The power path of the port controller 12 is connected to an internal system bus VSYS 18 and a port power bus VBUS 17. In the present description, the ports 13 are configured for bidirectional power flow. Thus, each port 13 can be connected to a power provider (a power source or a power supply) or a power consumer (a power sink or a load). The multi-port system 10 can be configured in the sink configuration where ports 13 are upstream facing port sinking or consuming VBUS power supplied by an external device. That is, a power source supplies power to serial port 13 on the VBUS power bus which is used to drive the internal system coupled to the internal system bus VSYS 18. The multi-port system 10 can also be configured in the source configuration where ports 13 are downstream facing port providing power to an external device. That is, the internal system is a power source, such as a charger, which supplies power to serial port 13 on the VBUS power bus which is used to drive the external device coupled to the serial port 13.

Each port controller 12 includes a pair of blocking power switches Q1 and Q2 forming the power path for controlling the power transfer between two input/output nodes 17, 18. Each port controller 12 further includes a control circuit 14 driving the power switches Q1 and Q2 and also providing control, fault detection and protection functions. In the present example, the power switches Q1 and Q2 are constructed as back-to-back field effect transistors (FETs). By using the blocking power switches Q1 and Q2 in each port controller 12, each port is isolated from the other port and no current passes from one port to another port. As described above, each of nodes 17 and 18 can be either an input node or an output node depending on the sink or source configuration of the multi-port system 10. In embodiments of the present disclosure, nodes 17 and 18 can be used interchangeably as input nodes or output nodes.

By way of explanation, assuming the multi-port system 10 is in a sink configuration, when an external device is connected to a port 13, such as Port 1, the device provides 5V on VBUS1. The device can then negotiate through the port controller 1 for a higher voltage in the event that the device is capable of providing power at a higher voltage, e.g. 20V. After the negotiation handshake, the port controller 1 determines the device can handle a higher voltage and enables VBUS1 to increase to 20V. The internal system bus VSYS 18 is in turns also driven to 20V. In another example, when another external device is connected to a port 13, such as Port 2, the device provides 5V on VBUS2. The device negotiates through the port controller 2 that it is only capable of providing 5V. In that case, after the negotiation handshake, Port 2 remains powered at 5V.

The port controller 12 is configured to detect a fault condition, such as short, over-current or over-voltage, and asserts a fault signal. In some embodiments, the fault signal is an open drain signal FLTB. Each port controller 12 also receives a disable signal DISB. In some embodiments, the fault signals and the disable signals of all of the port controllers 12 are connected together to a fault signal bus. When one of the port controller 12 asserts the fault signal, the asserted fault signal pulls down on the fault signal bus which in turn asserts the disable signals connected to the fault signal bus. The disable signal DISB of all the port controllers will be asserted and the control circuit 14 in each port controller 12 will turn off the power switches and disable the power path in each port controller. In this manner, in the multi-port system 10 including multiple parallel ports, the fault signal FLTB of one port controller is asserted to disable all the port controllers.

In the parallel multi-port power delivery system of FIG. 1, the port controller 12 is configured to detect a variety of fault conditions, such as short, over-current or over-voltage, and assert the fault signal. In the two-port system example shown in FIG. 1, there are six possible combinations of shorts along the power path. For instance, Node A (VBUS1) may be shorted to Node B indicating a failure at power switch Q1 of Port Controller 1. Node A may be shorted to Node C (VSYS) indicating a short between the source terminals of the two back-to-back power switches at Port Controller 1. Node B (between power switches Q1 and Q2) may be shorted to Node C indicating a failure at the power switch Q2 of Port Controller 1. Node E (VBUS2) may be shorted to Node D indicating a failure at power switch Q1 of Port Controller 2. Node E may be shorted to Node C (VSYS) indicating a short between the source terminals of the two back-to-back power switches at Port Controller 2. Node D (between power switches Q1 and Q2) may be shorted to Node C indicating a failure at the power switch Q2 of Port Controller 2.

To ensure adequate protection of the multi-port system 10, the port controllers 12 should be capable of detecting all or most of the short conditions along the power path, between any Nodes A to E. Conventional fault detection schemes often is capable of detecting only a subset of the fault conditions. Furthermore, conventional fault detection schemes often is capable of detecting fault only when a port is disabled and not when a port is enabled.

Figure 2:
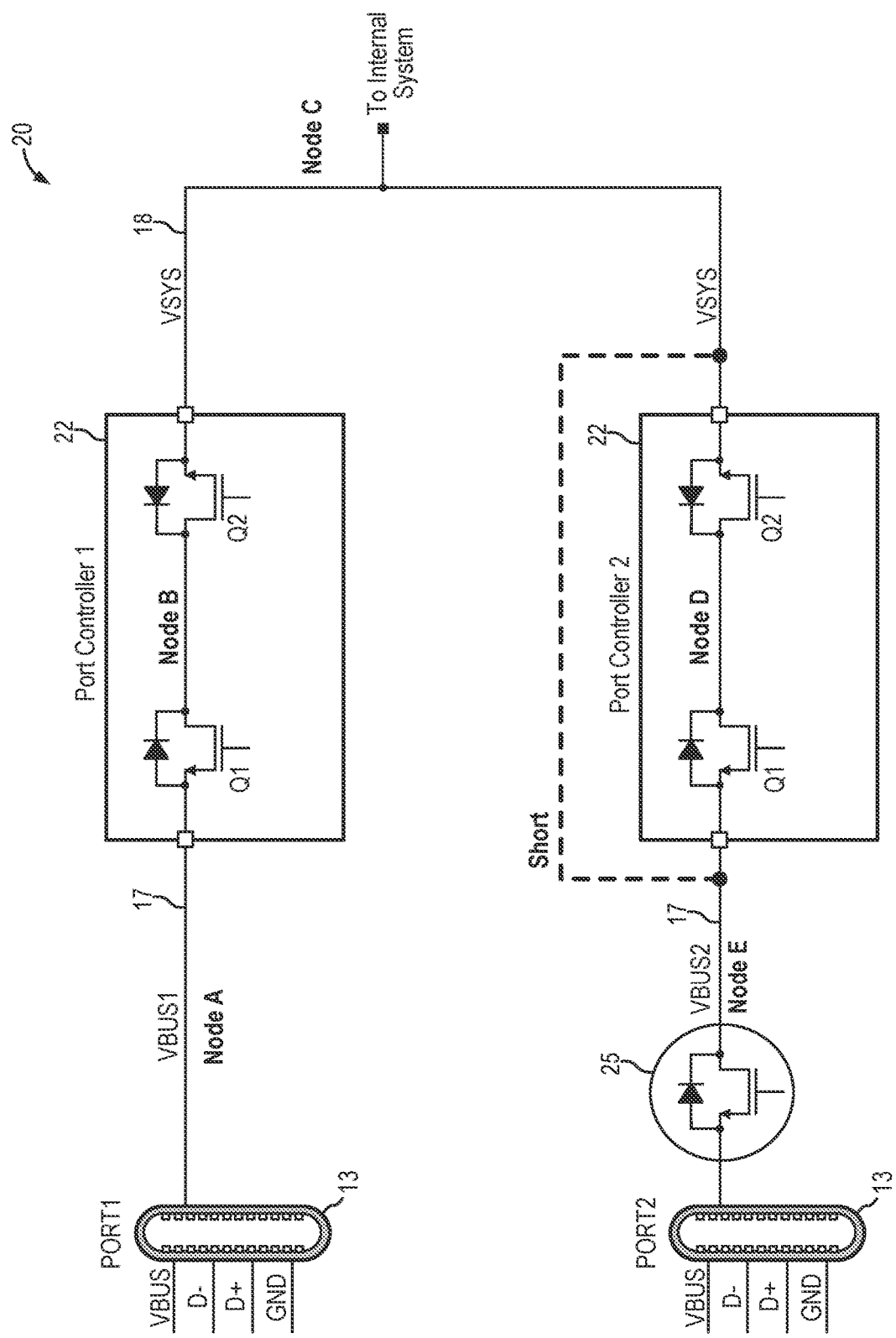
FIG. 2 illustrates a conventional fault detection scheme implemented in a multi-port system in some examples.

FIG. 2 illustrates a conventional fault detection scheme implemented in a multi-port system in some examples. Referring to FIG. 2, the multi-port system 20 includes port controllers 1 and 2 coupled to respective PORT1 and PORT2. In some examples, serial ports 13 are Type C ports, or USB-C ports. An over-voltage protection (OVP) scheme is implemented at the port controllers 22. For instance, Port controller 2 senses whether the voltage at Node E is in excess of the maximum allowable voltage, such as by comparing the voltage at Node E to a 5V rail over-voltage threshold. In the event that Port Controller 2 detects an over-voltage condition, Port Controller 2 asserts the fault signal and causes Port Controller 1 to disable the power path.

In one example, when PORT1 is enabled and PORT2 is disabled, the internal system bus 18 is at 20V. PORT2 is disabled so that Node E should remain at 5V. In the fault scenario that Node E is shorted to Node C, either by solder bridge or damaged by destruction event, Port Controller 2 senses an over-voltage condition at Node E and asserts the fault signal which alerts Port Controller 1 of the fault condition and Port Controller 1 turns off the power path in response. In this fault scenario, Node E may be momentarily at a high voltage due to a Node E to Node C short before the over-voltage protection is activated. Thus, the device connected to PORT2 may see a high voltage (20V) momentarily. In cases where the low voltage devices connected to PORT2 cannot handle the high voltage (20V) or when the system requires a guarantee that a low voltage port (5V) does not see a high voltage (20V), an additional over-voltage protection switch 25 is connected in series between a port controller (such as Port Controller 2) and the port connector. The over-voltage protection switch 25 is turned off when PORT2 is disabled to guarantee that devices connected to PORT2 will not see excessive voltages. In FIG. 2, only PORT2 is provided with the over-voltage protection switch

25. In the case that both PORT1 and PORT2 are configured to handle 5V and 20V rail interchangeably, then both ports will need the over-voltage protection switch 25 in series with the port connector and the port controller. The over-voltage protection switch 25 increases system cost.

Conventional fault detection solutions are not desirable as the prior solutions are only capable of detecting a subset of fault conditions and the fault detection is highly dependent on port impedance. Furthermore, prior solutions often enable fault detection only when the port is disabled or not being used. If a port is enabled and has a device plugged into the connector and the port controller has a power switch short circuit, the port controller cannot detect the fault condition and alert the host system. Thus, when a port is enabled, no fault protection may be provided. In one prior solution, an additional set of power switches or port controller circuits are used, as shown in FIG. 3.

Figure 3:
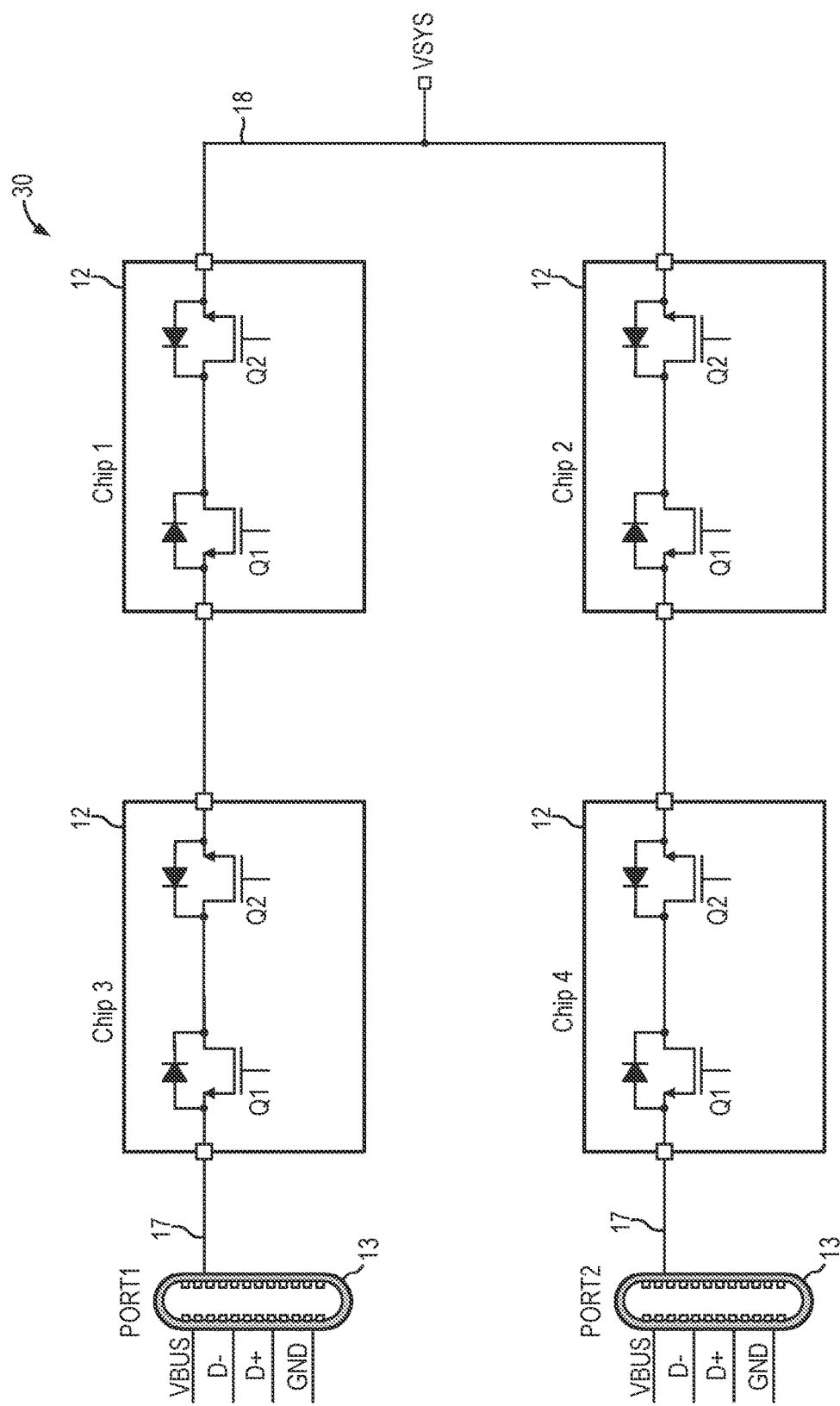
FIG. 3 illustrates a fault protection scheme in a multi-port system in some examples.

FIG. 3 illustrates a fault protection scheme in a multi-port system in some examples. Referring to FIG. 3, to provide protection of the ports when the ports are enabled, an additional set of power switches is connected in series between the port connector and the original port controller. The fault protection scheme in FIG. 3 is undesirable as it increases the total number of power switches from four to eight for a two-port system, representing a significant increase in system cost. Also, the series connection of two sets of power switches introduces too much voltage drop for 5V devices.

In embodiments of the present disclosure, a port controller implements a real-time fault detection scheme where each port controller monitors its own port in real-time, or when the port is enabled, to perform self-diagnosis and fault detection. The real-time fault detection scheme of the present disclosure is capable of detecting any short within the power path of the port controller and capable of protecting noncompliant (or low voltage) downstream port without needing additional set of power switches in series with the power path.

Figure 4:
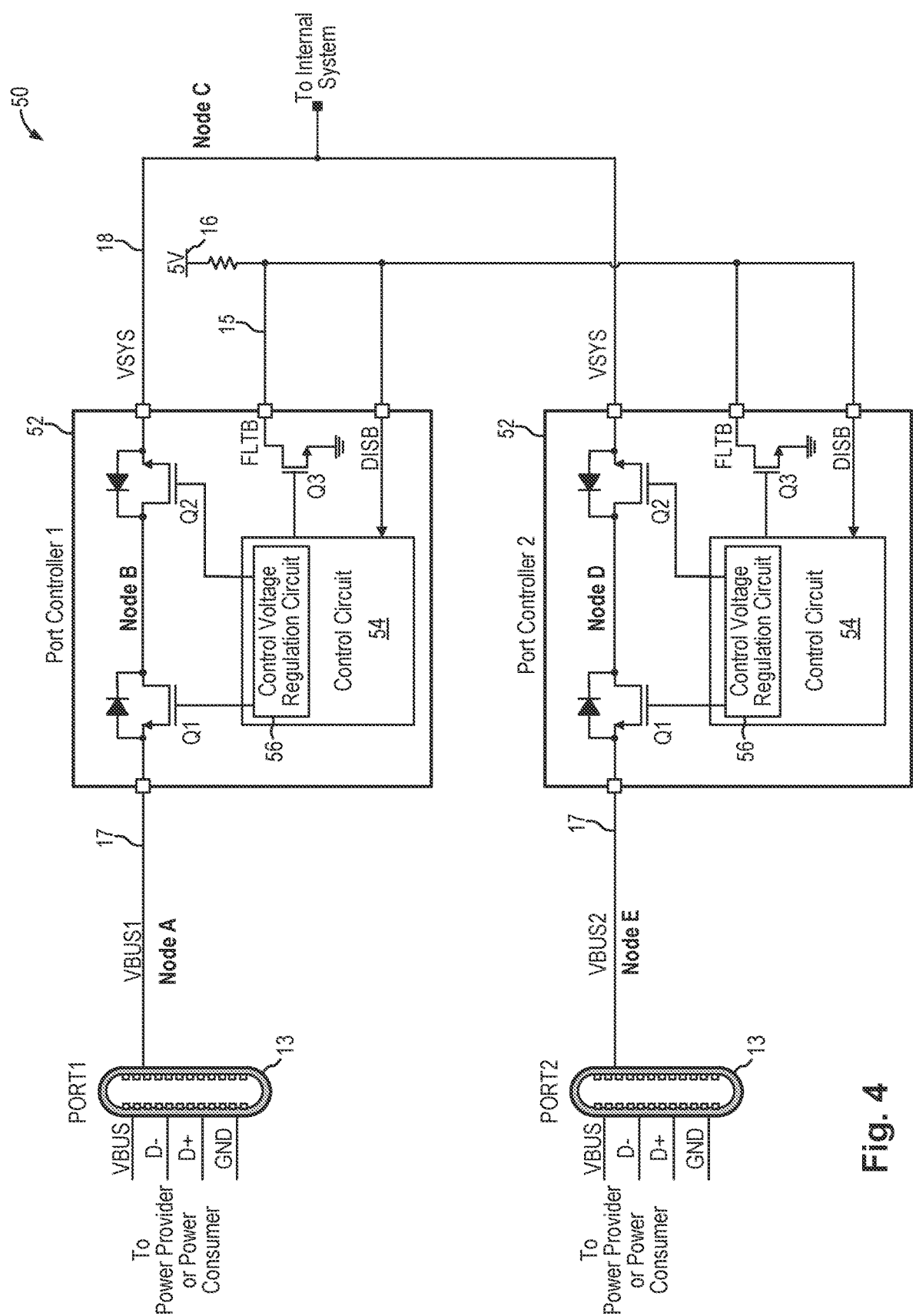
FIG. 4 is a schematic diagram of a multi-port system implementing a real-time fault detection scheme in embodiments of the present disclosure.

FIG. 4 is a schematic diagram of a multi-port system implementing a real-time fault detection scheme in embodiments of the present disclosure. Referring to FIG. 4, a multi-port system 50 includes port controllers 52 coupled to respective serial ports 13. The multi-port system 50 is constructed in a similar manner to the multi-port system 10 of FIG. 1, with the addition of the control voltage regulation circuits to implement the real-time fault detection scheme. Similar elements in FIGS. 1 and 3 are given like reference numerals to simplify the discussion.

In the present embodiment, multi-port system 50 includes a pair of port controllers 52 coupled to control respective serial ports 13, including Port1 and Port2. In particular, the port controller 1 is coupled to serial port Port1 while the port controller 2 is coupled to serial port Port 2. In some embodiments, serial ports 13 are Type C ports, or USB-C ports. The power path of each port controller 52 is connected to an internal system bus VSYS 18 and a port power bus VBUS 17. In the present description, the ports 13 are configured for bidirectional power flow. Thus, each port 13 can be connected to a power provider (a power source or a power supply) or a power consumer (a power sink or a load). The multi-port system 50 can be configured in the sink configuration or a source configuration where ports 13 are either coupled to a power provider or a power consumer.

In the present description, the multi-port system 50 is illustrated as including two ports, each coupled to a respective port controller. In other embodiments, the multi-port system can include two or more ports, each port coupled to a respective port controller. The use of two ports in multi-port system 50 is illustrative only and not intended to be limiting.

Each port controller 52 includes a pair of blocking power switches Q1 and Q2 forming the power path for controlling the power transfer between two input/output nodes 17, 18. Each port controller 52 further includes a control circuit 54 driving the power switches Q1 and Q2 and also providing control, fault detection and protection functions. In the present example, the power switches Q1 and Q2 are constructed as back-to-back field effect transistors (FETs). By using the blocking power switches Q1 and Q2 in each port controller 52, each port is isolated from the other port and no current passes from one port to another port. More specifically, the source terminal of power switch Q1 is connected to the port power bus VBUS 17 and the source terminal of the power switch Q2 is connected to the internal system bus VSYS 18. The drain terminals of the power switches Q1 and Q2 are connected together. The gate terminals of power switches Q1 and Q2 are controlled by the control circuit 54. The control circuit 54 turns on the power switches Q1 and Q2 to enable the power path and turns off the power switches Q1 and Q2 to disable the power path.

The port controller 52 is configured to detect a fault condition, such as short, over-current or over-voltage, and asserts a fault signal FLTB. In the present description, the fault signal FLTB is an open drain signal generated at a transistor Q3. The control circuit 54 of the port controller 52, upon detection of a fault condition, asserts the control signal to transistor Q3 to turn on the transistor. The transistor Q3 pulls down on the fault signal FLTB to indicate a detected fault condition. The open drain transistor Q3 is resistively connected to a power supply 16 providing a given voltage (e.g. 5V). The fault signal FLTB of all the port controllers 52 are connected together to a fault signal bus 15 which is resistively connected to the power supply 16. Each port controller 52 also includes a disable signal DISB which is connected to fault signal bus 15. Accordingly, when one of the port controller 52 asserts the fault signal and pulls down on the fault signal bus 15, the disable signal DISB of all the port controllers will be asserted (active low) and the control circuit 54 in each port controller 52 will turn off the power switches and disable the power path in each port controller.

In embodiments of the present disclosure, each port controller 52 includes control voltage regulation circuit 56 to regulate the control voltages of the power switches Q1 and Q2. The control voltage regulation circuit 56 also operates to monitor the control voltage applied to each power switch Q1 or Q2 to detect fault conditions. The control voltage regulation circuit 56 determines the control voltage to a power switch is outside of the permissible range and generates a fault detection signal Fault which can be used to control transistor Q3 to generate the fault signal FLTB. More specifically, the control voltage regulation circuit 56 regulates the control voltage of power switch Q1 and power switch Q2 independently to maintain a given regulation voltage across the source and drain terminals of the transistors. If the control voltage regulation circuit 56 has to regulate the control voltage to the power switch to a value that is lower than a threshold, the circuit 56 determines that a fault condition exists at the power switch and can assert the fault detection signal. In this manner, the port controller can determine if one power switch or both power switches are shorted. Furthermore, the fault detection can be realized in real-time, that is, when the power path is enabled and the power switches are to be turned on. Conventional fault detection solutions only enable detection when the power path is disabled or not being used. The port controller of the present disclosure is capable of fault detection event while a power path is enabled and the associated serial port is being coupled to or plugged into a device.

In one example, if a power switch is shorted, the voltage regulation circuit 56 will decrease the control voltage to the power switch to 0 V in an attempt to increase the drain-source voltage to the target regulated value. When the control voltage of the power switches decreases to a given level, the voltage regulation circuit 56 determines a fault has occurred at the power switch. In this manner, the port controller 52 determines in real-time that the power switch is shorted and generates the fault detection signal.

Figure 5:
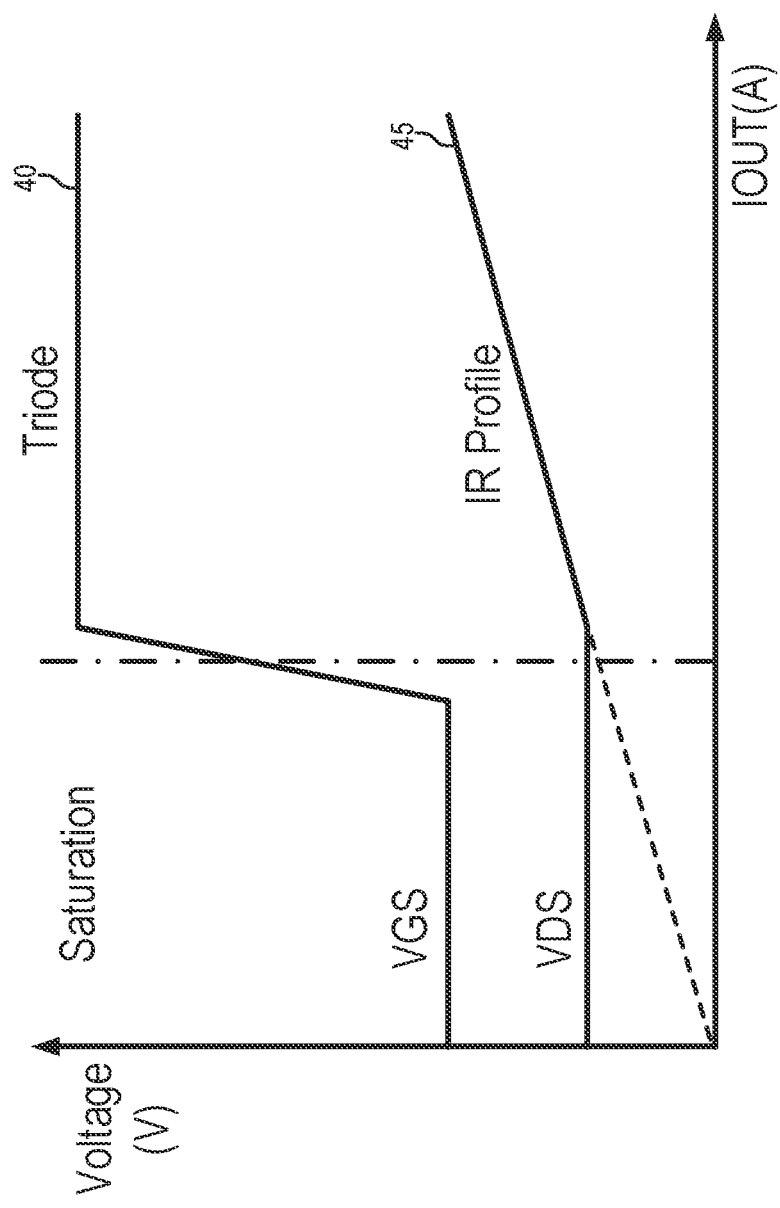
FIG. 5 illustrates the current-voltage characteristics of a MOSFET power switch in some examples.

In the conventional port controller, the control circuit turns the power switches of the power path on or off. In embodiments of the present disclosure, the power switches Q1 and Q2 are being regulated to be barely turned on. Therefore, even at no load, the control voltage of the power switch is regulated to keep the power switch in saturation. The regulation of the control voltage of the power switches can be illustrated by the voltage-current plot of FIG. 5. FIG. 5 illustrates the current-voltage characteristics of a MOSFET power switch in some examples. Referring to FIG. 5, the current-voltage (IV) characteristics of the gate-to-source voltage VGS (curve 40) and the drain-to-source voltage VDS (curve 45) versus the output current IOUT are shown. The gate-to-source voltage VGS will almost be constant until IR loses of the FET is greater than the regulated drain-to-source voltage VDS. At that time, the gate-to-source voltage VGS of the power switch will fully enhance minimizing any power loss at heavy load.

In embodiments of the present disclosure, under the real-time fault detection scheme, the power controller keeps the power switches to be always on. The power switches, implemented as field effect transistors (FET), will operate in two regions: saturation and triode. In operation, if a short is across drain to source of the transistor, the control voltage regulation circuit will try to increase the drain to source impedance until the transistor turns off, signaling an abnormal state.

Figure 6:
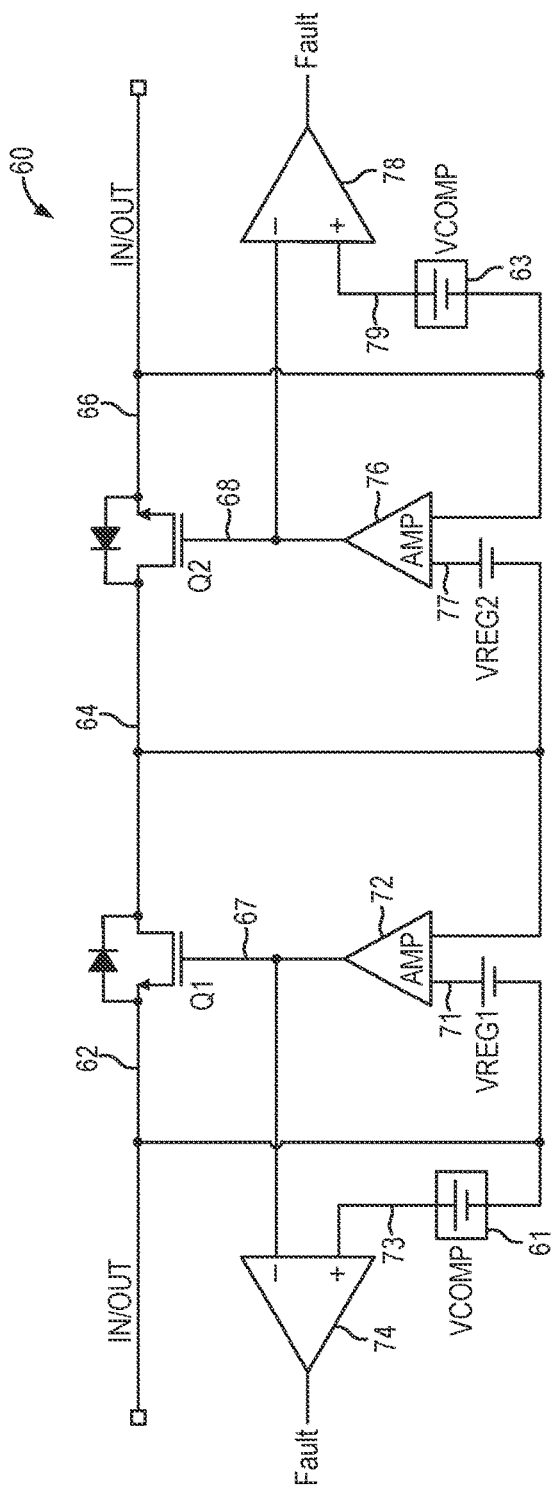
FIG. 6 is a schematic diagram of a control voltage regulation circuit coupled to drive a pair of back-to-back power switches in a port controller for implementing the real-time fault detection scheme in embodiments of the present disclosure.

FIG. 6 is a schematic diagram of a control voltage regulation circuit coupled to drive a pair of back-to-back power switches in a port controller for implementing the real-time fault detection scheme in embodiments of the present disclosure. The control voltage regulation circuit can accommodate common source or common drain configurations. The embodiment shown in FIG. 6 illustrates a common drain configuration. Referring to FIG. 6, a port controller 60 includes a pair of power switches Q1 and Q2 connected in series between terminals 62 and 66 to form a power path Each of the terminals 62 and 66 can be an input terminal or an output terminal. That is, the input and output terminals of the power path are interchangeable to facilitate bidirectional power transfer between the two terminals.

In embodiments of the present disclosure, the power switches are constructed as MOSFET devices including a gate terminal 67 as the control terminal. The gate terminal receives a gate voltage, also referred to as a control voltage in the present description. The drain and source terminal of the MOSFET device are interchangeable. In the present embodiment, the power switches are in the common drain configuration. Therefore, the drain terminals of power switches Q1 and Q2 are connected to node 64. The source terminal of power switch Q1 is connected to terminal 62 while the source terminal of power switch Q2 is connected to terminal 66.

The port controller 60 includes a control voltage regulation circuit for controlling independently the control voltage (or gate voltage) of each power switch to regulate the voltage across the source to drain terminals of the power switch for the common drain configuration (and drain to source terminals for common source configuration). In the present embodiment, the control voltage regulation circuit is described as including a first gate voltage regulator circuit for regulating the gate voltage of the first power switch and a second gate voltage regulator circuit for regulating the gate voltage of the second power switch. The first and second gate voltage regulator circuits are constructed in a similar fashion to generate the gate voltages for driving the respective power switches to maintain the desired voltage across the source-to-drain terminal of the power switches.

At power switch Q1, the first gate voltage regulator circuit includes an amplifier 72 generating the control voltage to drive the control terminal 67 of power switch Q1. The amplifier 72 measures the source to drain voltage across the power switch Q1. That is, a first terminal 71 of the amplifier is coupled to the source terminal 62 and a second terminal of the amplifier is coupled to the drain terminal 64. In particular, the first terminal 71 of the amplifier is coupled to the source terminal 62 through a power supply providing a first regulation voltage VREG1. In other words, the source voltage is increased by the first regulation voltage VREG1 and then provided to the first terminal 71 of the amplifier 72. The amplifier 72 generates a gate voltage to drive the control terminal of power switch Q1 so that the source-to-drain voltage (VDS) across the source-drain terminals 62, 64 is maintained at a voltage value equaling the first regulation voltage VREG1.

As amplifier 72 is regulating the control voltage to power switch Q1, a comparator 74 monitors the gate to source voltage (VGS1) of the power switch Q1. In particular, the comparator 74 has a negative input terminal coupled to the gate terminal 67 of power switch Q1 and a positive input terminal 73 coupled to a comparator voltage VCOMP generated by a comparator voltage circuit 61. In some embodiments, the comparator voltage circuit 61 generates a comparator voltage having a voltage value that is less than the threshold voltage VT of the power switch Q. In the present embodiment, the comparator voltage VCOMP is referenced to the voltage at the source terminal 62 of power switch Q1. In some embodiments, the threshold voltage VT of the power switch Q1 may be 0.7V and the comparator voltage VCOMP may be selected to be around 0.4V to 0.5V. In other embodiments, the comparator voltage VCOMP is selected to be 50% to 90% of the threshold voltage VT of the power switch Q1. The comparator 74 generates a fault detection signal Fault in response to the gate voltage becoming less than the comparator voltage VCOMP. As thus configured, the comparator 74 compares the gate-to-source voltage (VGS1) of the power switch Q1 to the comparator voltage VCOMP which has a voltage value less than the transistor threshold voltage.

In operation, the comparator 74 deasserts the fault detection signal Fault in response to the gate-to-source voltage (VGS1) of the power switch Q1 being greater than the comparator voltage, that is, greater than the threshold voltage VT of the power switch. The comparator 74 asserts the fault detection signal Fault in response to the gate-to-source voltage (VGS1) of the power switch Q1 becoming less than the comparator voltage, i.e. less than the threshold voltage VT of the power switch.

At power switch Q2, the second gate voltage regulator circuit includes an amplifier 76 and a comparator 78 configured in a similar manner as the first gate voltage regulator circuit for power switch Q1. In the common drain configuration, the amplifier 76 receives the drain voltage (node 64) increased by a second regulation voltage VREG2 and also receives the source voltage (node 66) of power switch Q2. The comparator 78 compares the gate-to-source voltage VGS2 of the power switch Q2 against a comparator voltage VCOMP generated by a comparator voltage circuit 63. The comparator voltage VCOMP has a voltage value less than the threshold voltage VT of the power switch Q2. For example, the comparator voltage is selected to be 50% to 90% of the threshold voltage VT of the power switch Q2. In the present embodiment, power switches Q1 and Q2 are constructed using the same MOSFET device type and has the same threshold voltage. The comparator voltages VCOMP used for comparator 74 and comparator 78 have the same voltage value.

In operation, the comparator 78 deasserts the fault detection signal Fault in response to the gate-to-source voltage (VGS2) of the power switch Q2 being greater than the comparator voltage, that is, greater than the threshold voltage VT of the power switch. The comparator 78 asserts the fault detection signal Fault in response to the gate-to-source voltage (VGS2) of the power switch Q2 becoming less than the comparator voltage, that is, less than the threshold voltage VT of the power switch.

As thus configured, by comparing the gate-to-source voltage of the power switch to a comparator voltage being less than the power switch's turn on voltage, each gate voltage regulator circuit can signal when the power switch is conducting even with a gate-to-source voltage that is below the turn on voltage and assert the fault detection signal to indicate that the power switch is compromised.

The control voltage regulation circuit in port controller 60 realizes many advantages over conventional fault detection solutions. First, by actively regulating each power switch in the power path independently allows for real-time detection that the power path may have a fault condition. Second, by keeping each back-to-back FET device drain-to-source voltage fixed, the impedance of the FET can vary allowing the system to know if there is a power path that is parallel to the port controller in the form of a short. Third, the fault detection scheme allows for all possible short configuration to be detected and even can detect if there are multiple shorts in the power path.

In embodiments shown in FIG. 6, the first and second gate voltage regulator circuits maintain the source-to-drain voltage of respective power switches Q1 and Q2 at the respective regulation voltage. In some examples, the source-to-drain voltage of power switches Q1 and Q2 is maintained at 35 mV each. The configuration of the first and second gate voltage regulator circuits maintain the source-to-drain voltages across of power switch Q1 and power switch Q2 independently at 35 mV each. In other embodiments, the first and second gate voltage regulator circuits can be configured to maintain one power switch at 35 mV source-to-drain voltage and the other power switch at the 70 mV source-to-source voltage across the two power switches in the power path.

Figure 7:
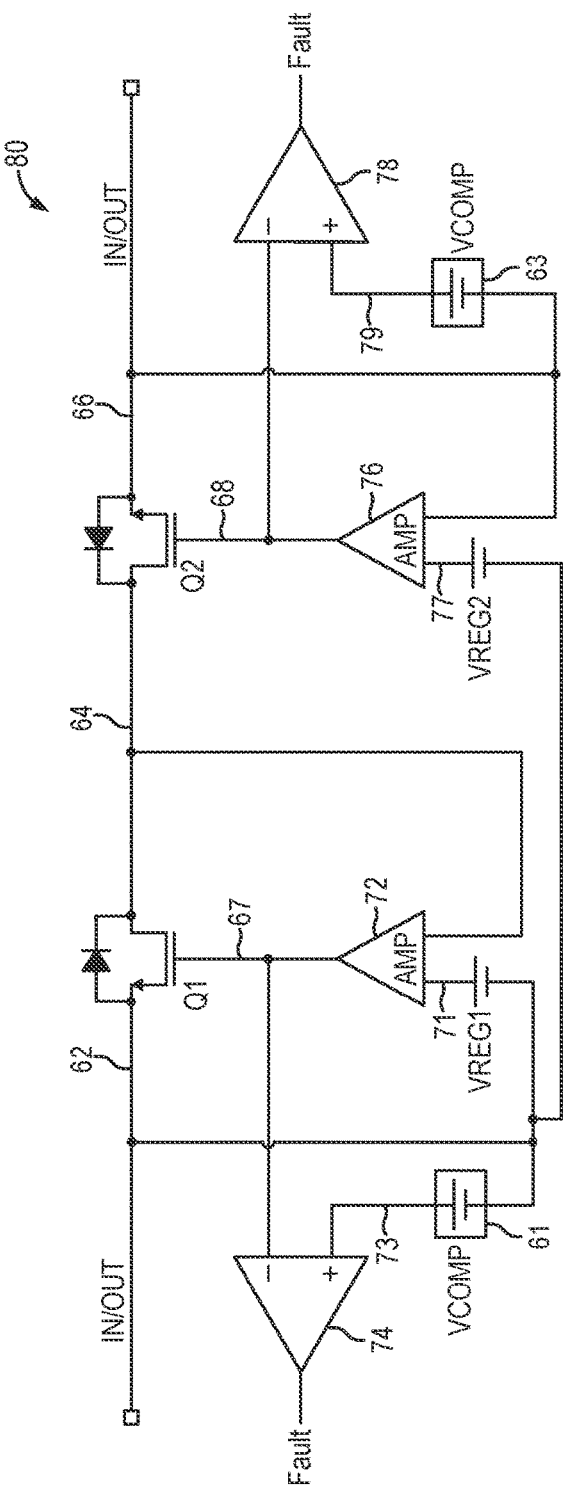
FIG. 7 is a schematic diagram of a control voltage regulation circuit coupled to drive a pair of back-to-back power switches in a port controller for implementing the real-time fault detection scheme in a first alternate embodiment of the present disclosure.

FIG. 7 is a schematic diagram of a control voltage regulation circuit coupled to drive a pair of back-to-back power switches in a port controller for implementing the real-time fault detection scheme in a first alternate embodiment of the present disclosure. The embodiment shown in FIG. 7 illustrates a common drain configuration. Referring to FIG. 7, the control voltage regulator circuit in the port controller 80 includes a first gate voltage regulator circuit configured in the same manner as the first gate voltage regulator circuit of FIG. 6. The control voltage regulator circuit includes a second gate voltage regulator circuit configured to regulate the source-to-source voltage across power switches Q1 and Q2. In other words, the second gate voltage regulator circuit is configured to regulate the voltage across node 62 and node 66, between the source terminals of the two power switches.

Accordingly, the amplifier 76 receives the source voltage of the power switch Q1 (node 62) increased by the second regulation voltage VREG2 and also receives the drain voltage of the power switch Q2 (node 106). In this embodiment, the second regulation voltage VREG2 is twice the first regulation voltage VREG1 as the amplifier 76 is regulating the source-to-drain voltages across two transistors. In one example, the first regulation voltage VREG1 is 35 mV and the second regulation voltage VREG2 is 70 mV.

In the above described embodiments, the power switches Q1 and Q2 are configured in the common drain configuration with the drain terminals of the power switches being connected together at node 64. In alternate embodiments of the present disclosure, the power switches can be configured in a common source configuration with the source terminals of the power switches connected together instead.

Figure 8:
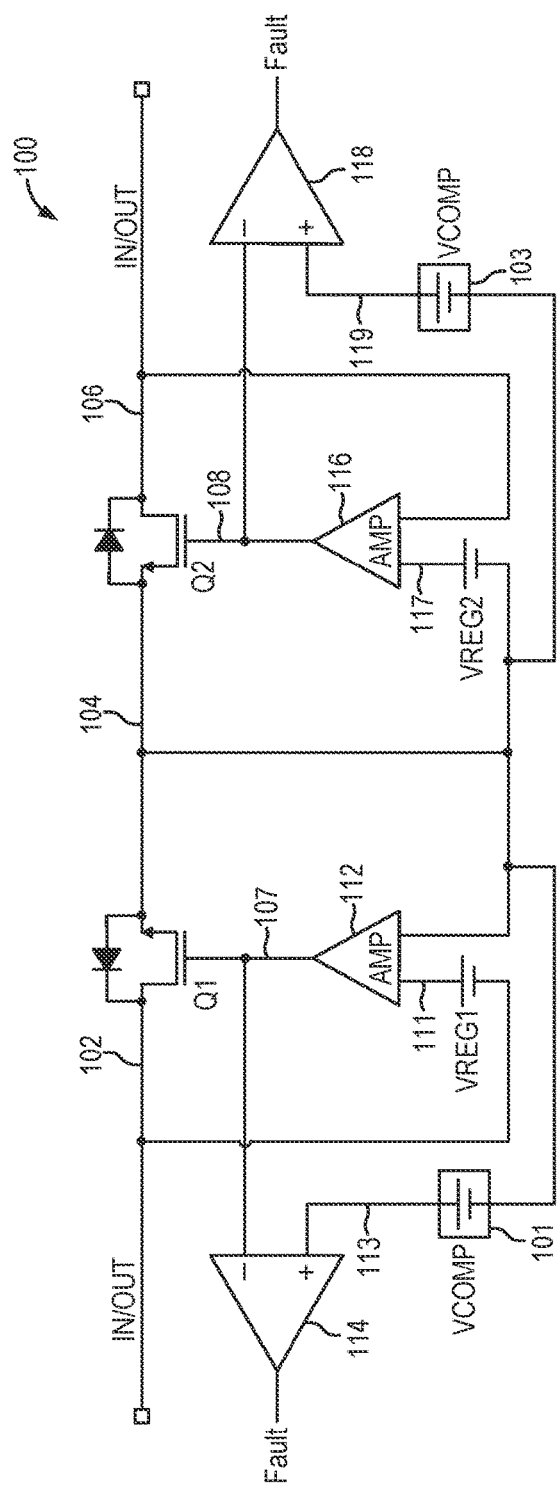
FIG. 8 is a schematic diagram of a control voltage regulation circuit coupled to drive a pair of back-to-back power switches in a port controller for implementing the real-time fault detection scheme in a second alternate embodiment of the present disclosure.

FIG. 8 is a schematic diagram of a control voltage regulation circuit coupled to drive a pair of back-to-back power switches in a port controller for implementing the real-time fault detection scheme in a second alternate embodiment of the present disclosure. The embodiment shown in FIG. 8 illustrates a common source configuration. Referring to FIG. 8, the control voltage regulator circuit in the port controller 100 includes a first gate voltage regulator circuit and a second gate voltage regulator circuit configured in a similar manner as the first and second gate voltage regulator circuits of FIG. 6. In the common source configuration, the source terminals of the power switches Q1 and Q2 are connected together at node 104. The drain terminal of power switch Q1 is connected to terminal 102 and the drain terminal of power switch Q2 is connected to terminal 106.

In the common source configuration, the first gate voltage regulator circuit regulates the gate voltage of power switch Q1 in response to the drain-to-source voltage of power switch Q1. In particular, the amplifier 112 receives the drain voltage (node 102) increased by the regulation voltage VREG1 and also receives the source voltage (node 104). The amplifier 112 generates the gate voltage to maintain the drain-to-source voltage of power switch Q1 to be at the regulation voltage value. The first gate voltage regulator circuit monitors the gate-to-source voltage VGS1 of the power switch Q1 using a comparator 114. The comparator 114 has a positive input terminal coupled to receive a comparator voltage VCOMP generated by a comparator voltage circuit 101. The comparator 114 has a negative input terminal coupled to receive the gate voltage (node 107) at the gate terminal of the power switch Q1. In this manner, the comparator 114 compares the gate-to-source voltage VGS1 to the comparator voltage VCOMP. In one embodiment, the comparator voltage VCOMP is less than the threshold voltage VT of the power switch Q1. In other embodiments, the comparator voltage VCOMP is selected to be 50% to 90% of the threshold voltage VT of the power switch Q1.

The second gate voltage regulator circuit regulates the gate voltage of power switch Q2 in response to the drain-to-source voltage of power switch Q2. The second gate voltage regulator circuit includes an amplifier 116 and a comparator 118 configured in a similar manner as the first gate voltage regulator circuit for power switch Q1. In the common source configuration, the amplifier 116 receives the source voltage (node 104) increased by a second regulation voltage VREG2 and also receives the drain voltage (node 106) of power switch Q2. The comparator 118 monitors the gate-to-source voltage of power switch Q2. The comparator 118 compares the gate-to-source voltage VGS2 of the power switch Q2 against a comparator voltage VCOMP generated by a comparator voltage circuit 103. That is, the comparator 118 receives the gate voltage (node 108) of power switch Q2 on a negative input terminal 108 and also receives the comparator voltage at the positive input terminal 119.

The comparator voltage has a voltage value less than the threshold voltage VT of the power switch Q2. In the present embodiment, the comparator voltages used for comparator 114 and comparator 118 have the same voltage value. In one embodiment, the comparator voltage is less than the threshold voltage of the MOSFET device forming the power switches Q1 and Q2. In other embodiments, the comparator voltage VCOMP is selected to be 50% to 90% of the threshold voltage VT of the power switch Q2.

In embodiments shown in FIG. 8, the first and second gate voltage regulator circuits maintain the drain-to-source voltage of respective power switches Q1 and Q2 at the respective regulation voltage (e.g. 35 mV). In other embodiments, the first and second gate voltage regulator circuits can be configured to maintain one power switch at 35 mV s drain-to-source voltage and the other power switch at the 70 mV drain-to-drain voltage across the two power switches in the power path.

Figure 9:
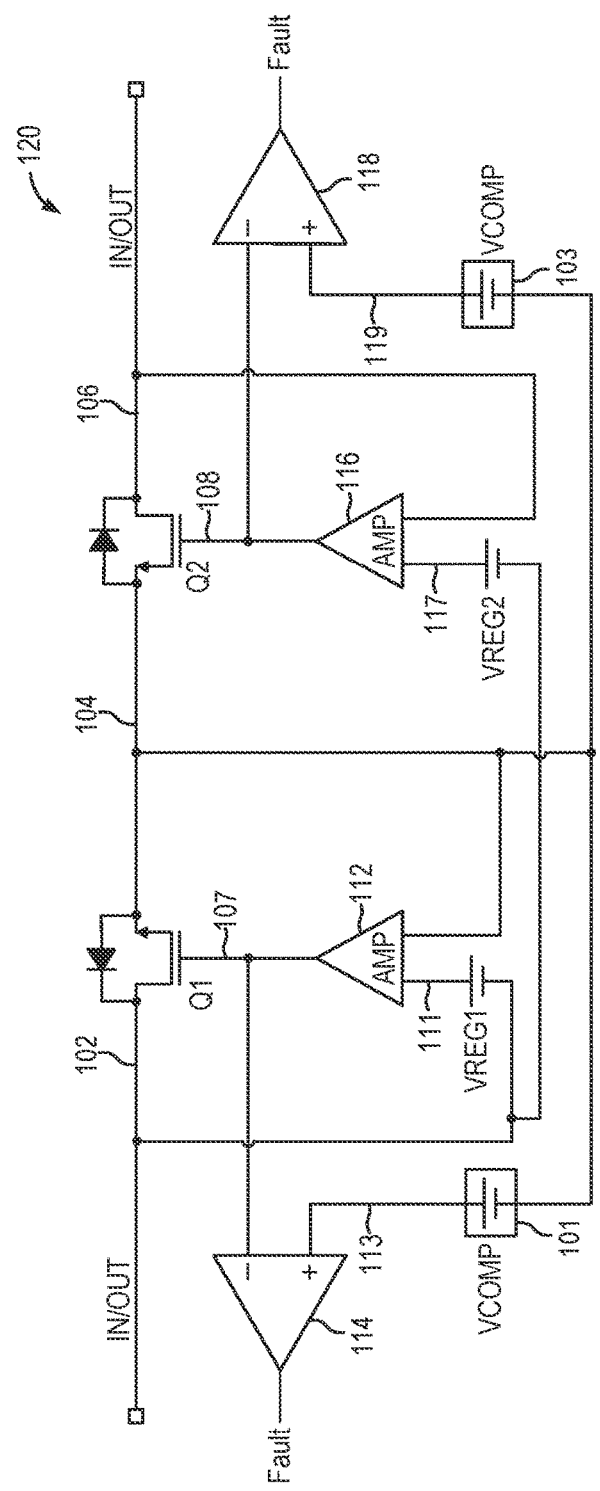
FIG. 9 is a schematic diagram of a control voltage regulation circuit coupled to drive a pair of back-to-back power switches in a port controller for implementing the real-time fault detection scheme in a third alternate embodiment of the present disclosure.

FIG. 9 is a schematic diagram of a control voltage regulation circuit coupled to drive a pair of back-to-back power switches in a port controller for implementing the real-time fault detection scheme in a third alternate embodiment of the present disclosure. The embodiment shown in FIG. 9 illustrates a common source configuration. Referring to FIG. 9, the control voltage regulator circuit in the port controller 120 includes a first gate voltage regulator circuit configured in the same manner as the first gate voltage regulator circuit of FIG. 8. The control voltage regulator circuit includes a second gate voltage regulator circuit configured to regulate the drain-to-drain voltage across power switches Q1 and Q2. In other words, the second gate voltage regulator circuit is configured to regulate the voltage across node 102 and node 106, between the drain terminals of the two power switches.

Accordingly, the amplifier 116 receives the drain voltage of the power switch Q1 (node 102) increased by the second regulation voltage VREG2 and also receives the drain voltage of the power switch Q2 (node 106). In this embodiment, the second regulation voltage VREG2 is twice the first regulation voltage VREG1 as the amplifier 116 is regulating the drain-to-source voltages across two transistors. In one example, the first regulation voltage VREG1 is 35 mV and the second regulation voltage VREG2 is 70 mV. The comparator 118 monitors the gate-to-source voltage of power switch Q2. That is, the comparator 118 receives the gate voltage (node 108) of power switch Q2 on a negative input terminal and also receives the source voltage (node 104) of the power switch Q2 increased by the comparator voltage at a positive input terminal.

Figure 10:
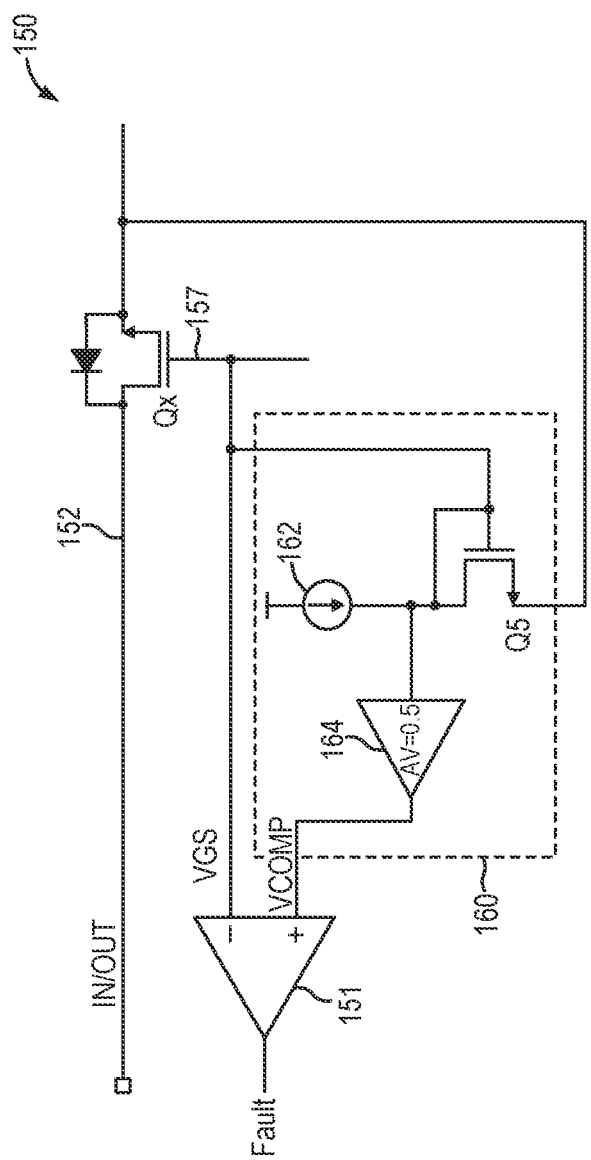
FIG. 10 is a circuit diagram illustrating a comparator voltage circuit in embodiments of the present disclosure.

In the above-described embodiments, the comparator voltage VCOMP used at comparator of the gate voltage regulator circuit has a voltage value that is less than the threshold voltage of the power switch associated thereto. The comparator voltage circuit generating the comparator voltage VCOMP can be constructed in various manner to provide a comparator voltage VCOMP that is relative to the threshold voltage of the power switch. FIG. 10 is a circuit diagram illustrating a comparator voltage circuit in embodiments of the present disclosure. Referring to FIG. 10, a comparator voltage circuit 160 can be incorporated into a port controller 150 to generate the comparator voltage VCOMP in the gate voltage regulator circuit. In particular, a transistor Q5 mimics the power switch Qx and is driven by the same gate voltage. The transistor Q5 is diode connected and is supplied by a current source 162. As thus configured, the reference voltage at the drain terminal of the transistor Q5 is the threshold voltage VT plus the overdrive voltage VOD. The reference voltage is reduced by reducing the pull-up current provided by current source 162 or by increasing the W/L ratio of transistor Q5. In the present example, the reference voltage is reduced by half to account for inaccuracies. The reduced reference voltage is provided as the comparator voltage VCOMP.

Figure 11:
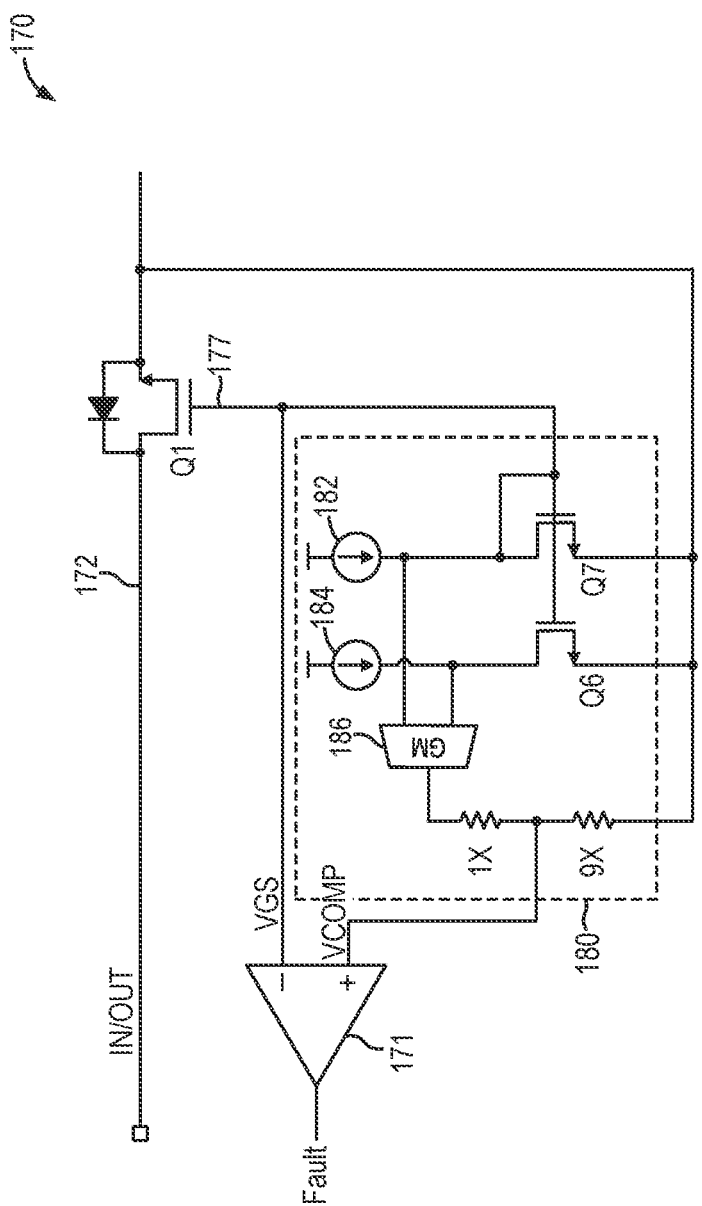
FIG. 11 is a circuit diagram illustrating a comparator voltage circuit in alternate embodiments of the present disclosure.

FIG. 11 is a circuit diagram illustrating a comparator voltage circuit in alternate embodiments of the present disclosure. Referring to FIG. 11, a comparator voltage circuit 180 can be incorporated into a port controller 150 to generate the comparator voltage VCOMP in the gate voltage regulator circuit. In this embodiment, a reference voltage is generated where the overdrive voltage VOD (generated at transistor Q6) is subtracted from the sum of the threshold voltage VT and the overdrive voltage VOD (generated at transistor Q7). The reference voltage is left with the threshold voltage VT. The reference voltage is reduced by 10% using the resistor divider to account for inaccuracies. The reduced reference voltage is provided as the comparator voltage VCOMP.

FIGS. 10 and 11 illustrate two exemplary embodiments of the comparator voltage circuit. FIGS. 10 and 11 are illustrative only and not intended to be limiting. Other methods to generate a comparator voltage that is less than the threshold voltage of the power switch can be used in the control voltage regulation circuit of the present disclosure.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A port controller circuit configured to control power transfer on a power path between a first terminal and a second terminal, the controller circuit comprising:
   first and second transistors connected in series between the first terminal and the second terminal, a control terminal of the first transistor receiving a first gate voltage and a control terminal of the second transistor receiving a second gate voltage; and
   a first gate voltage control circuit configured to generate the first gate voltage driving the control terminal of the first transistor, the first gate voltage control circuit regulating the first gate voltage to keep the first transistor turned on,
   wherein in response to the first gate voltage control circuit regulating the first gate voltage to a voltage value less than a first voltage level, the first gate voltage control circuit asserting a first signal to indicate a fault condition at the first transistor.

2. The port controller circuit of claim 1, wherein the first gate voltage regulates the first gate voltage to keep the first transistor turned on by regulating the first gate voltage to maintain a predetermined voltage difference across a first current terminal and a second current terminal of the first transistor.

3. The port controller circuit of claim 1, wherein the first voltage level has a voltage value less than a threshold voltage of the first transistor.

4. The port controller circuit of claim 1, wherein the first gate voltage control circuit comprises:
   a first gate voltage regulator circuit configured to generate and to regulate the first gate voltage to maintain a predetermined voltage difference across a first current terminal and a second current terminal of the first transistor; and
   a first comparator circuit configured to compare a first voltage indicative of the first gate voltage to a first comparator voltage indicative of the first voltage level and to assert a first comparator output signal in response to the first voltage being lower than the first comparator voltage, the first comparator output signal being the first signal.

5. The port controller circuit of claim 4, wherein the first voltage comprises a voltage across the control terminal and the first current terminal of the first transistor.

6. The port controller circuit of claim 4, wherein the first comparator voltage is 50-90% of the threshold voltage of the first transistor.

7. The port controller circuit of claim 1, further comprising:
   a second gate voltage control circuit configured to generate the second gate voltage driving the control terminal of the second transistor, the second gate voltage control circuit regulating the second gate voltage to keep the second transistor turned on,
   wherein in response to the second gate voltage control circuit regulating the second gate voltage to a voltage value less than the first voltage level, the second gate voltage control circuit asserting a second signal to indicate a fault condition at the second transistor.

8. The port controller circuit of claim 7, wherein the second gate voltage regulates the second gate voltage to keep the second transistor turned on by regulating the second gate voltage to maintain a predetermined voltage difference across a first current terminal and a second current terminal of the second transistor.

9. The port controller circuit of claim 7, wherein the first voltage level has a voltage value less than a threshold voltage of the first transistor and the second transistor.

10. The port controller circuit of claim 7, wherein the second gate voltage control circuit comprises:
    a second gate voltage regulator circuit configured to generate and to regulate the second gate voltage to maintain a predetermined voltage difference across a first current terminal and a second current terminal of the second transistor; and
    a second comparator circuit configured to compare a second voltage indicative of the second gate voltage to a second comparator voltage indicative of the first voltage level and to assert a second comparator output signal in response to the second voltage being lower than the second comparator voltage, the second comparator output signal being the second signal.

11. The port controller circuit of claim 10, wherein the second voltage comprises a voltage across the control terminal and the first current terminal of the second transistor.

12. The port controller circuit of claim 10, wherein the second comparator voltage is 50-90% of the threshold voltage of the second transistor.

13. The port controller circuit of claim 1, wherein a first current terminal of the first transistor is connected to the first terminal and a first current terminal of the second transistor is connected to the second terminal, and a second current terminal of the first transistor is connected to a second current terminal of the second transistor.

14. A method in a port controller circuit configured to control power transfer between a first terminal and a second terminal, the method comprising:
    transferring power from the first terminal to the second terminal through first and second transistors connected in series;
    regulating a first gate voltage coupled to drive the first transistor to keep the first transistor turned on; and
    in response to the first gate voltage being regulated to a voltage value less than a first voltage level, asserting a first signal to indicate a fault condition at the first transistor.

15. The method of claim 14, wherein regulating a first gate voltage coupled to drive the first transistor to keep the first transistor turned on comprises:
    regulating a first gate voltage coupled to drive the first transistor to maintain a predetermined voltage difference across a first current terminal and a second current terminal of the first transistor.

16. The method of claim 14, wherein the first voltage level has a voltage value less than a threshold voltage of the first transistor.

17. The method of claim 15, further comprising:
    comparing a first voltage indicative of the first gate voltage to a first comparator voltage indicative of the first voltage level; and
    responsive to the first voltage being lower than the first comparator voltage, asserting a first comparator output signal, the first comparator output signal being the first signal.

18. The method of claim 17, wherein the first voltage comprises a voltage across the control terminal and the first current terminal of the first transistor.

19. The method of claim 17, wherein the first comparator voltage is 50-90% of the threshold voltage of the first transistor.

20. The method of claim 14, further comprising:
- regulating a second gate voltage coupled to drive the second transistor to keep the second transistor turned on; and
- in response to the second gate voltage being regulated to a voltage value less than the first voltage level, asserting a second signal to indicate a fault condition at the second transistor.

* * * * *